(12) United States Patent
Betcher

(10) Patent No.: US 9,963,847 B2
(45) Date of Patent: *May 8, 2018

(54) WAVE ATTENUATION SYSTEM AND METHOD

(71) Applicant: Christopher Fred Betcher, Deer Harbor, WA (US)

(72) Inventor: Christopher Fred Betcher, Deer Harbor, WA (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/386,665

(22) Filed: Dec. 21, 2016

(65) Prior Publication Data

US 2017/0167095 A1 Jun. 15, 2017

Related U.S. Application Data

(62) Division of application No. 14/712,127, filed on May 14, 2015, now Pat. No. 9,556,573.

(60) Provisional application No. 62/000,370, filed on May 19, 2014, provisional application No. 62/118,173, filed on Feb. 19, 2015.

(51) Int. Cl.
  *E02B 3/06* (2006.01)
(52) U.S. Cl.
  CPC .................... *E02B 3/062* (2013.01)
(58) Field of Classification Search
  CPC combination set(s) only.
  See application file for complete search history.

(56) References Cited

U.S. PATENT DOCUMENTS

| | | | |
|---|---|---|---|
| 307,393 | A | 10/1884 | Hyde |
| 436,644 | A | 9/1890 | White |
| 817,904 | A | 4/1906 | Cook |
| 1,264,756 | A | 4/1918 | Begg |
| 1,397,025 | A | 11/1921 | Manley |
| 1,846,278 | A | 2/1932 | Roane |
| 2,185,458 | A | 1/1940 | Giliasso |
| 2,388,171 | A | 10/1945 | Mcvitty |
| 3,628,334 | A | 12/1971 | Coleman |
| 3,777,689 | A | 12/1973 | Edmonds |
| 3,791,150 | A | 2/1974 | Tachii |
| 3,864,920 | A | 2/1975 | Yozo |
| 3,877,233 | A | 4/1975 | Olsen |
| 3,884,042 | A | 5/1975 | Anderson |
| 3,969,901 | A | 7/1976 | Matsudaira |
| 3,991,576 | A | 11/1976 | Tazaki |
| 4,023,370 | A | 5/1977 | Oliver |
| 4,136,994 | A | 1/1979 | Fuller |
| 4,234,266 | A | 11/1980 | Angioletti |

(Continued)

*Primary Examiner* — Kyle Armstrong
(74) *Attorney, Agent, or Firm* — Pate Baird, PLLC

(57) ABSTRACT

A breakwater (wave attenuation system) includes two horizontal tubes as buoyant members connected to one another, their cross-sections representing vertices of a triangle, whose legs are interconnecting struts. A perforated, submerged, ballast tube forms the third vertex. Wave motion is perpendicular to the length of the float tubes tethered to an anchor at the sea floor. A lead float tube rises in response to an approaching wave, often cutting off the wave crest, while a trailing float tube rises less and later as the wave passes. Asynchronous rising and falling of the leading and trailing, floating, top tubes rocks the breakwater, redirecting and dissipating wave momentum, energy, and water volume by rotating the assembly, thrashing the water.

20 Claims, 12 Drawing Sheets

(56) References Cited

U.S. PATENT DOCUMENTS

| | | |
|---|---|---|
| 4,693,631 A | 9/1987 | McKay |
| 4,715,744 A | 12/1987 | Richey |
| 5,429,452 A | 7/1995 | Frost |
| 6,443,653 B1 | 9/2002 | Zingale |
| 7,572,083 B1 | 8/2009 | Bishop |
| 2008/0022915 A1 | 1/2008 | Budd |
| 2010/0178109 A1* | 7/2010 | Wilson .................... E02B 3/062 405/27 |
| 2011/0002739 A1 | 1/2011 | Howland |

* cited by examiner

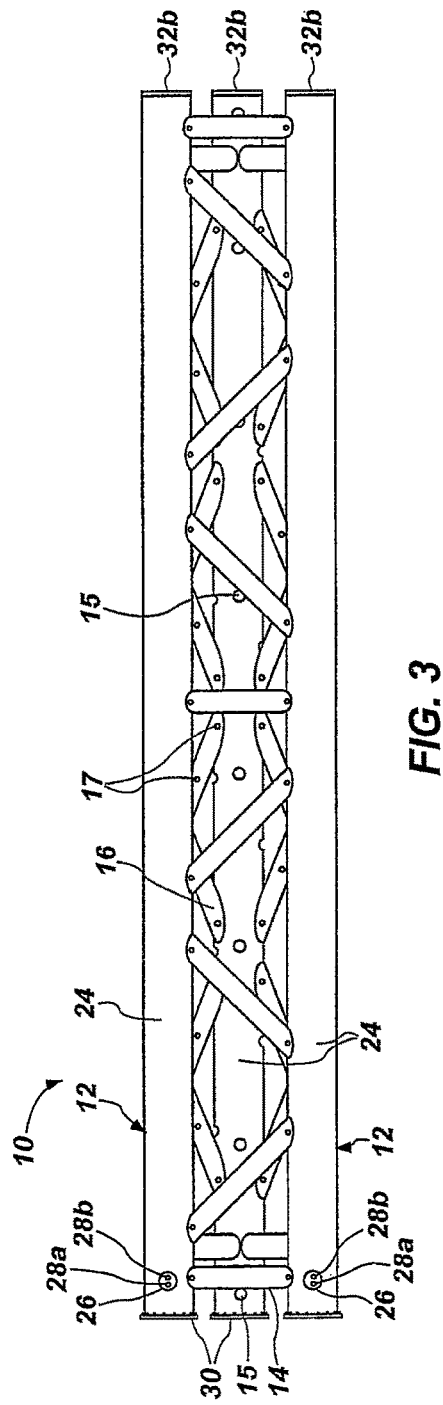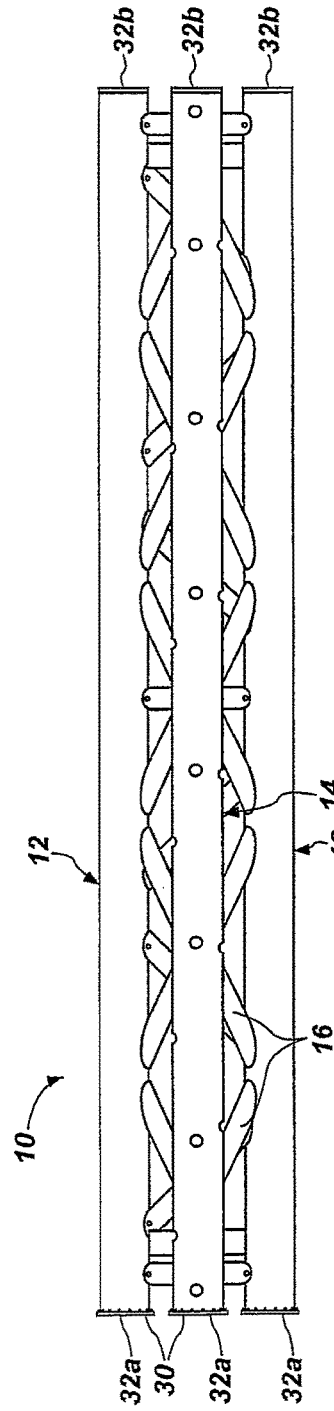

WAVE ATTENUATION SYSTEM AND METHOD

RELATED APPLICATIONS

This application: is a divisional of U.S. patent application Ser. No. 14/712,127, filed May 14, 2015; which claims the benefit of U.S. Provisional Patent Application Ser. No. 62/000,370, filed May 19, 2014, and claims the benefit of U.S. Provisional Patent Application Ser. No. 62/118,173, filed Feb. 19, 2015, all of which are incorporated herein by reference in their entirety. This application also incorporates by reference U.S. patent application Ser. No. 14/267,612, filed May 1, 2014, in its entirety.

BACKGROUND

Field of the Invention

This invention relates to marine facilities, and more particularly to breakwater systems.

Background Art

The cyclic forces and motion of wave activity near shorelines has traditionally created problems such as erosion of shorelines, damage of shore-based equipment, navigation problems for small watercraft near reefs, shorelines, and shore-based equipment, and so forth. Waves have a complex motion that includes both cyclical rising and falling of the water level as well as a to-and-fro or ebb-and-flow (actually flow and ebb, respectively) motion of the water as it flows toward shore and recedes away. Typically, wave attenuation systems, or "breakwaters" as they are typically called, have been devised from several mechanisms.

For example, conventional breakwater systems may include concrete sea walls against which the waves may pound, rock structures, such as rip-rap of rocks, which may or may not be retained within a steel net structure, jetties constructed of large boulders on the order of several feet across each, and some much larger, and so forth. Sometimes, certain floating structures have been used, such as floating logs, rafts, piers, and so forth. Likewise, pilings supporting various structures have also been used as breakwaters.

What is needed is a system that is resistant to the effects of erosion, suitable for redirecting mass, momentum, energy, and power generated by wave action. Such a system should be effective for cutting down wave height and reducing wave momentum and energy over a long (decades) period of time. Concrete eventually breaks up, fixed constructions such as rock piles, jetties, and the like require considerable construction with commensurate disruption of the sea bed and the marine environment, with the associated time, expense, and labor required. Floating systems are largely ineffective.

It would be an advance in the art to provide a simplified system that may be towed into place, anchored unobtrusively to the sea bed, and left to effectively operate for decades without significant maintenance, refurbishment, and the like.

Also, it would be highly desirable to provide a system that is sufficiently robust that it does not even require intense inspections more than every year or every several years during its lifetime.

BRIEF SUMMARY OF THE INVENTION

In view of the foregoing, in accordance with the invention as embodied and broadly described herein, a method and apparatus are disclosed in one embodiment of the present invention as including a breakwater or wave attenuation system includes two horizontally oriented tubes as buoyant members connected to one another and separated by a distance of about two diameters. A ballast tube is spaced from the floating tubes, forming their width an isosceles triangle. The ballast tube rides in the water, perforated to readily permit water to enter and exit. Wave motion is perpendicular to the float tubes, tethered to an anchor at the sea floor. Operation includes rising by a lead float tube in response to an approaching wave. The trailing float tube rises with the wave, but later, due to the separation and distance. The asynchronous rise and fall of the floating tubes causes a rocking of the breakwater system. This results in pivoting or rotating the assembly of tubes and struts (and all three tubes, necessarily at the same time), redirecting and dissipating the original wave momentum, energy, and water volume moving "forward" toward the shore.

Impact, flow around, and fluid drag on all three tubes and their intermediate struts cause redirection and dissipation of energy and momentum by motion of the tubes in the surrounding water. The circular cross-section of the tubes and struts causes longitudinal, lateral, and vertical dissipation and redirection of water along the length of the breakwater. The rocking causes churning in both the transverse (vertical) and lateral (horizontal) directions. Each is orthogonal to the longitudinal direction of the tubes. Redirection longitudinally is primarily due to the strut geometry. In practice, tremendous dissipation of energy has been effected, providing adequate attenuation of wind-induced waves on enclosed bodies of water as well as near shorelines subject to sea waves.

In one embodiment of a method in accordance with the invention, the method may include attenuating waves in open water by providing an anchor, securing a tether to the anchor, providing an array of tubes fixed to one another and floating horizontally in water, and securing the array to the anchor by the tether. In providing the array, the array may constitute a triangulated cross-section having vertices defined by first and second tubes at least partially evacuated of water to render them buoyant. A third tube, the ballast tube, may be fixed with respect to the two floating tubes to move in substantially rigid body motion therewith.

The first and second tubes may extend parallel to one another and the ballast tube and all extend substantially parallel to the surface of the water. The array may further comprise struts extending between the first, second, and third tubes. Typically, the first and second tubes are sealed and the ballast tube is perforated to admit from, and discharge into, a surrounding water environment. The struts may have perforations, which are also admitting and discharging water.

A sleeve between the array and the tether is effective to reduce chafing or resist chafing between the tether and the array.

The array further includes a first end wall and a second end wall to each of the first and second tubes at a respective first and second ends thereof, thereby sealing each of the first and second tubes. Flanges on at least one end of the array are mechanically fixed to the first end of each of the first, second, and ballast tubes to secure the array to another array of similar construction.

A port apparatus extending through the top of a wall of each of the first and second tubes is effective to selectively introduce and remove a quantity of water with inside each of the first and second tubes. This provides a selection of mass and buoyancy for the top tubes (first and second tubes) when sealed.

Struts extend between adjacent ones of the first, second, and third tubes. The angle of incidence of each strut is selected to engage the respective first, second, and third tubes at approximately a principal stress angle (zero, 45, 90 degrees).

The apparatus rocks in the water. Rocking, by the array, in a subject body of water is in response to a wave impinging on the first tube as a lead tube, and passing under the second tube as a trailing tube, while the first and second tubes sweep the ballast tube through the water. The first and second tubes redirect water of the wave, transferring energy from the wave. The ballast tube transfers momentum and energy from the first and second tubes into water surrounding the ballast tube. The result is effective to substantially reduce the energy, momentum, and effective height of the wave impinging on the array.

An apparatus typically comprises a first tube, a second tube fixedly secured to the first tube and spaced away therefrom, a third tube, operating as a ballast tube and fixed to both the first and second tubes, along with a tether secured between an anchor and at least one of the first tube, second tube, and third tube. The anchor is proximate a floor of the sea bed below a water level on which float the first and second tubes. The tether secures the at least one of the first, second, and third tubes to the anchor. The third tube is further provided with access to water surrounding it, in order to permit passage of water through the third tube.

First struts may be secured between the first and second tubes, with second struts extending between the first and third tubes. Finally, third struts extend between the second and third tubes. All struts may be perforated. At least the second struts and third struts should be perforated to admit water within themselves.

An anchor secures at least one of the first, second, and third tubes, by the tether, to resist movement away from the anchor within the body of water. Double tethers may extend away from each of the top (first and second) floating tubes in opposite directions. The anchor is effectively fixed proximate the "sea floor" representing the bottom of the body of water in which the first, second, and third tubes are placed and securing the tether.

The struts are oriented, with respect to a longitudinal direction of the first and second tubes, to extend in a direction corresponding to at least one principal stress direction. End caps provide structural support proximate one or more ends of each of the first, second, and third tubes, as well as sealing for flotation of the first and second tubes. Flanges secured proximate a first end of at least one of the first, second, and third tubes may be fitted with fasteners or other securement mechanisms to extend (e.g., double) the length of the unit of first, second, and third tubes.

In operation, the two horizontal members (floating tubes) remain buoyant, to an extent that depends on their contained-air-to-water ratio or, alternately, their void fraction (air volume divided by total volume). In contrast, the third member, extending parallel to them and fixed in relation thereto, remains fully submerged in and filled with water from the surrounding environment.

The anchors, of any suitable type, but well served by a penetrating anchor fully buried below the "sea floor," are arranged to secure one or more tethers (usually best served by about 5 tethers). The lines, ropes, or other stranded members constituting tethers each extend from the anchor to a member to restrain movement of the assembly of three members connected by struts.

All members move in effectively rigid body motion, although they may have some deflection due to internal strain. In response to waves impinging on a leading member the assembly rolls about a centerline of rotation parallel to the members. As the wave continues (diminished toward and under the trailing member), the assembly rocks back in the opposition rotational direction. The resultant thrashing of water surrounding the bottom or third member transfers and dissipates momentum and energy from the assembly into the water. To a large extent, the top members (leading and trailing) dissipate and re-direct energy and momentum from the wave by impact against them, movement in translation, consequent rotation, breaking over the members by water of the wave, and so forth. The struts contribute as well to dissipation and redirection of wave momentum and energy to locations elsewhere in the water as well as into localized turbulence that converts to thermal energy.

The result is substantial attenuation of energy, momentum, water volume, and height of the wave subsequently impinging on a shoreline or shoreward structures to levels below a predetermined fraction thereof initially found in the wave.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIG. 3 is a top plan view thereof;

FIG. 4 is a bottom plan view thereof;

DETAILED DESCRIPTION OF THE PREFERRED EMBODIMENTS

Figure 1:
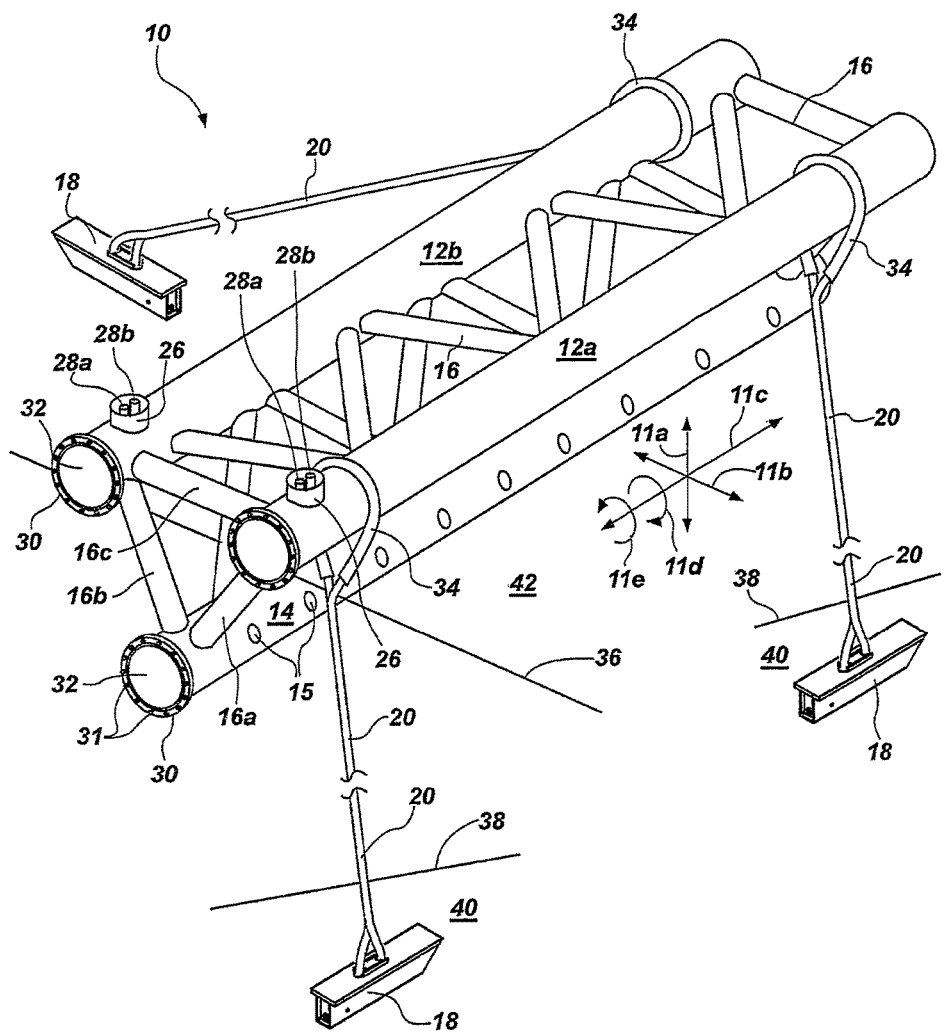
FIG. 1 is top, end perspective view of one embodiment of a breakwater or wave attenuation system in accordance with the invention.
Figure 2:
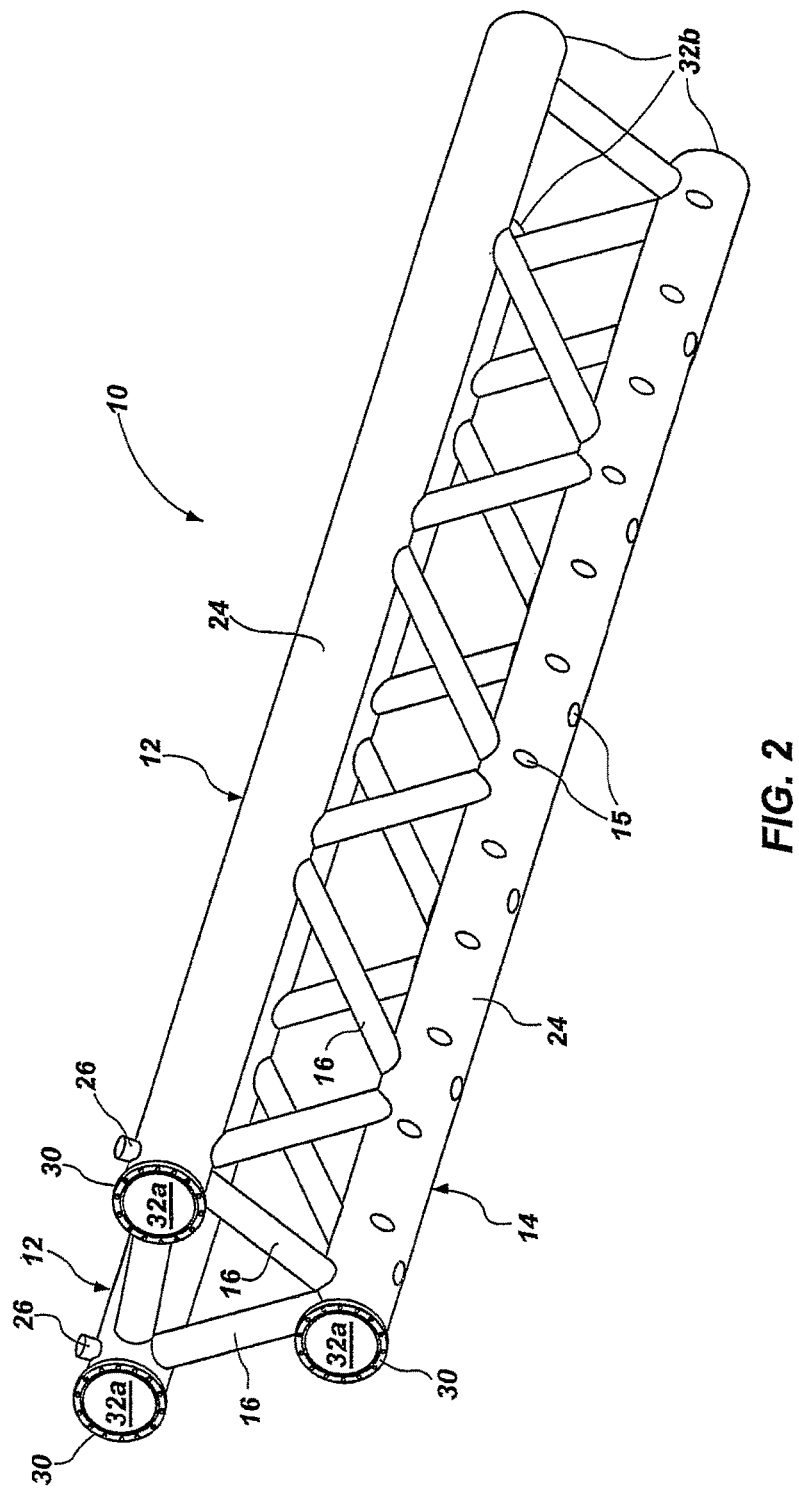
FIG. 2 is a bottom, end perspective view thereof, absent the tether and anchor.
Figure 5:
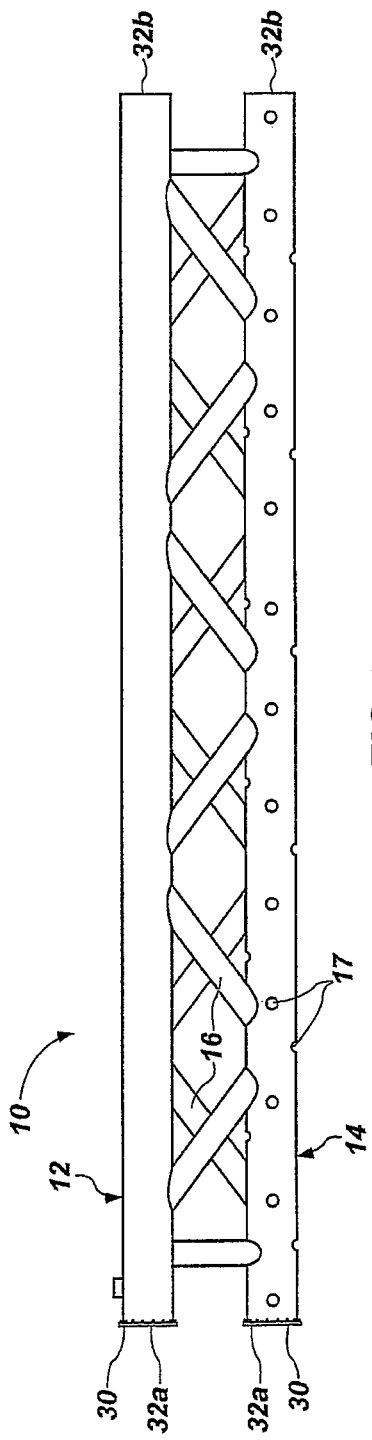
FIG. 5 is a front (windward, seaward) side elevation view thereof.
Figure 6:
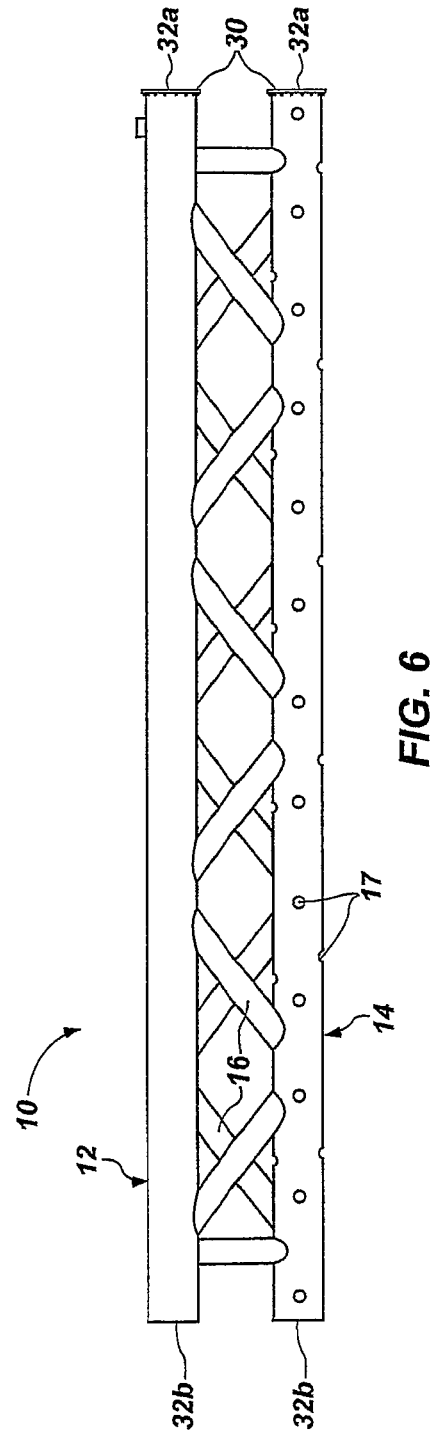
FIG. 6 is a rear (windward, seaward) side elevation view thereof.
Figure 7:
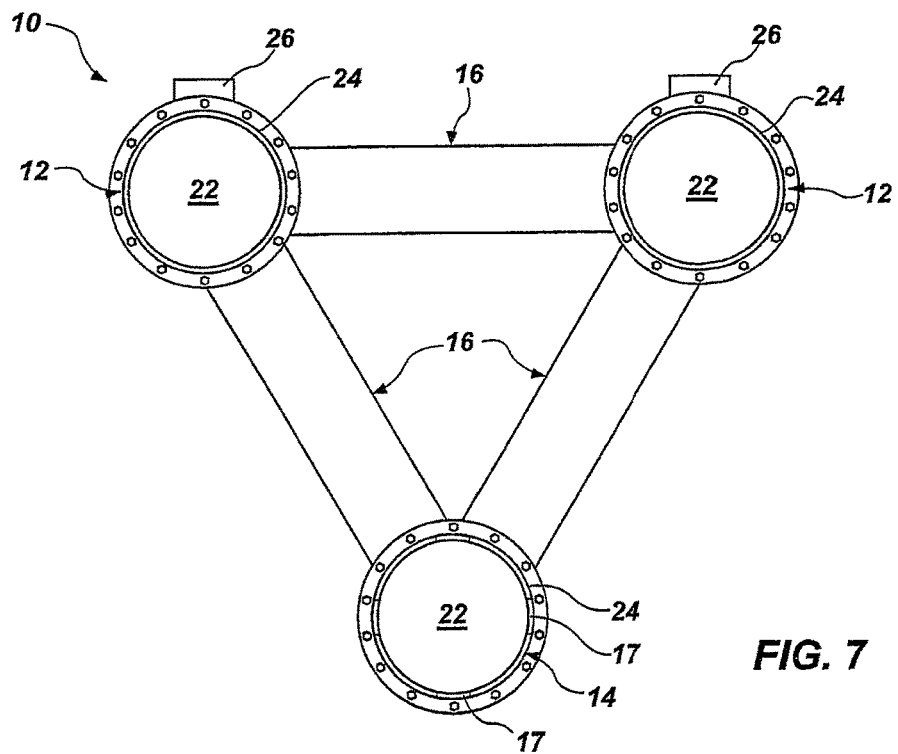
FIG. 7 is an end elevation view thereof at the coupled (flanged) end.
Figure 8:
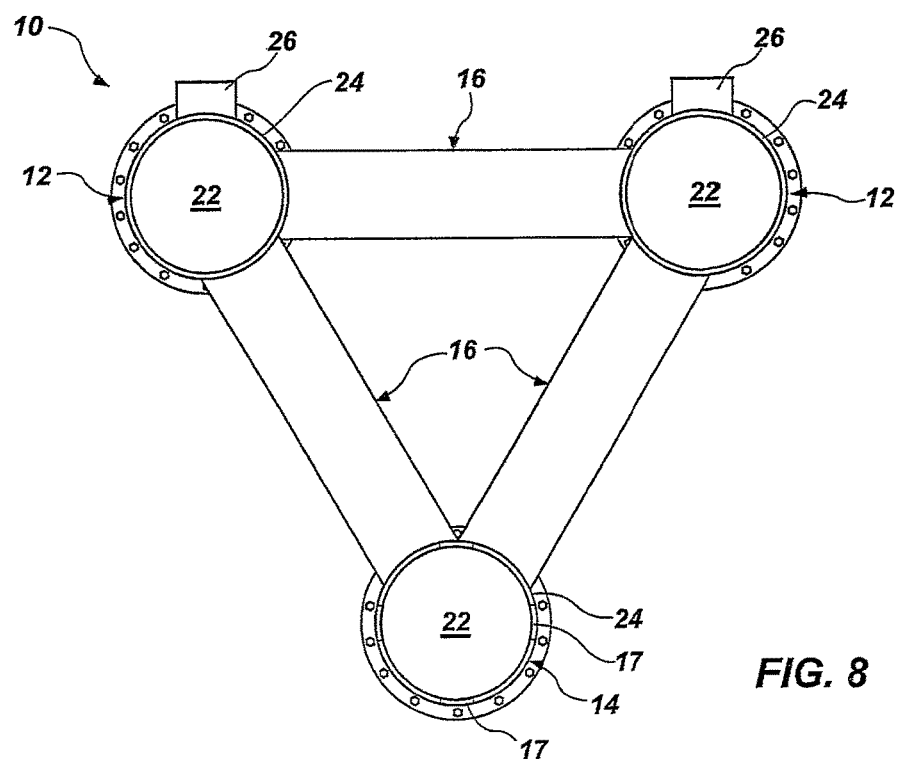
FIG. 8 is an end elevation view thereof from the free end.
Figure 9:
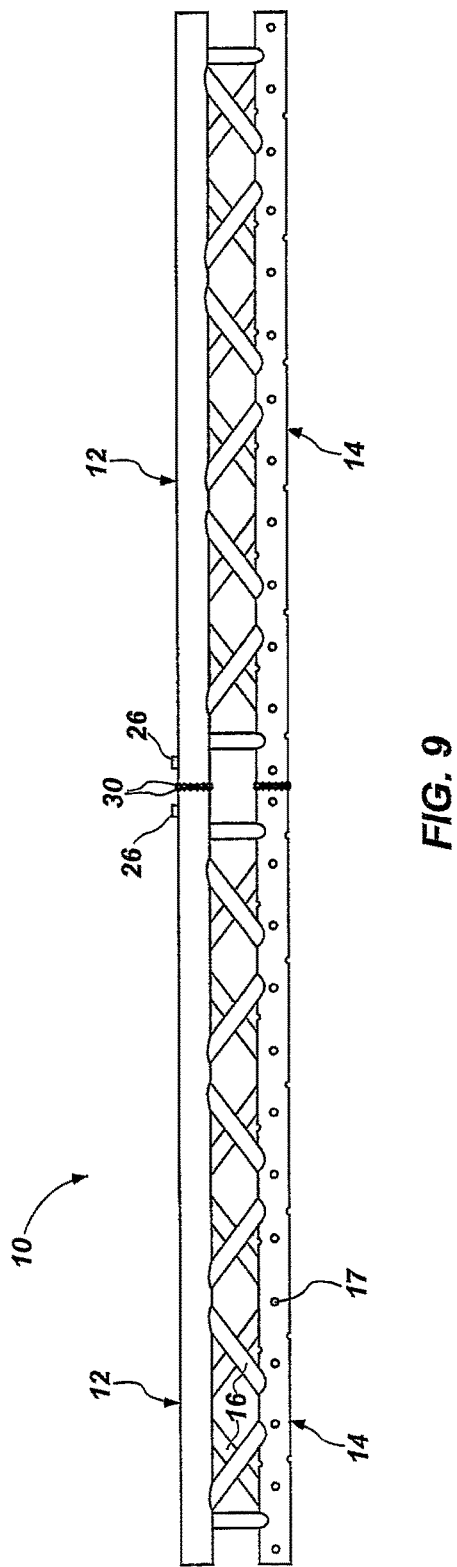
FIG. 9 is a front elevation view of a set of breakwater units secured together to make a single operational unit of double the manufactured length.
Figure 10:
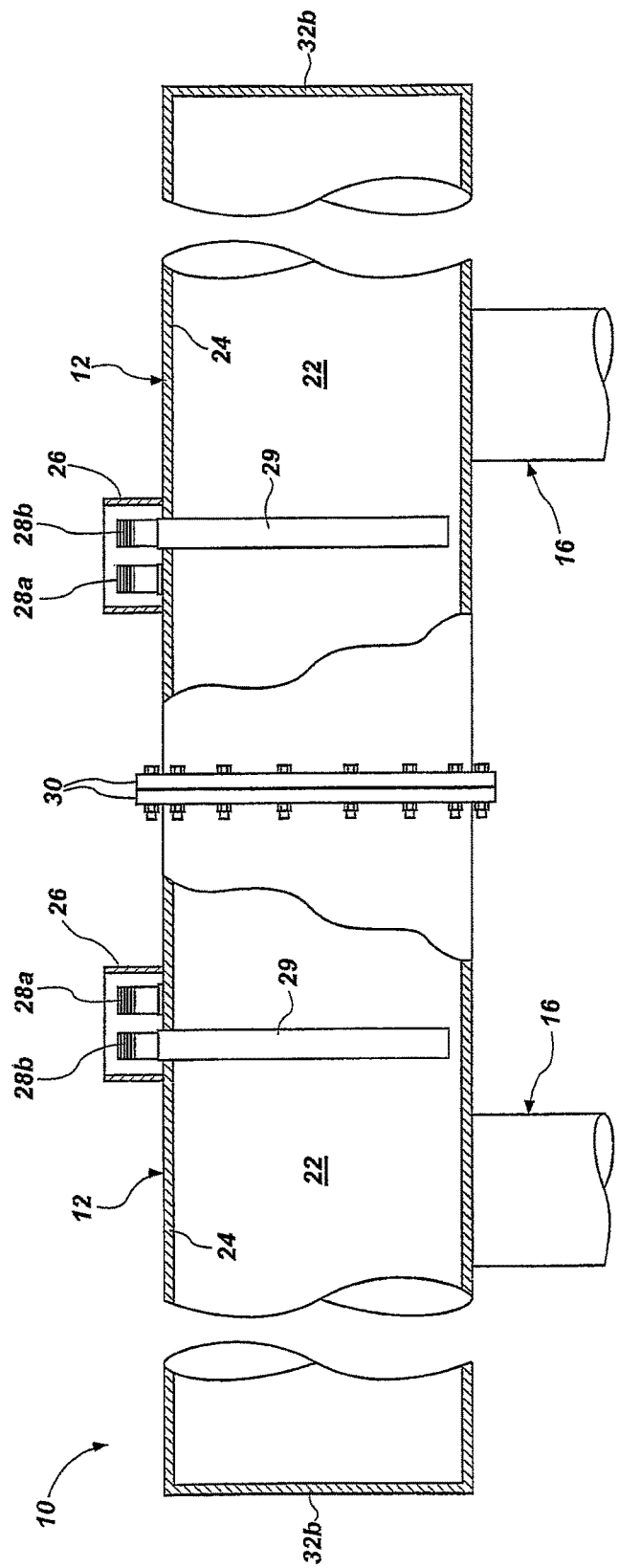
FIG. 10 is a front elevation, cross-sectional view of a top tube or float tube of the breakwater of FIGS. 1 through 9, partially cut away to show both ends.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Referring to FIGS. 1 through 10, while referring generally to FIGS. 1 through 16, a wave attenuation system 10 or breakwater 10 may involve several individual units. An individual unit 10 is composed of two floats 12 or float tubes 12 that ride on the surface by the buoyant actions of the water lifting the tubes 12 to the surface thereof, as a result of the contained air therewithin. Two "units" are typically connected end-to-end to make a "unit assembly." A unit assembly is typically anchored individually as part of an array of such assemblies protecting a length of shoreline, a harbor, a property, or the like.

Meanwhile, a ballast 14 or ballast tube 14 is fixed to the float tubes 12 to ride therebelow. The ballast tube 14 is provided with several large (one eighth to one quarter diameter) apertures 15. Typically, the apertures 15 may be about four inches in diameter in a two-foot diameter ballast tube 14. The float tubes 12 and ballast tube 14 in one embodiment are typically formed of a nominal two-foot-diameter, high-density, polyethylene tubing. The apertures 15 may be spaced at a suitable distance along the length of each of the ballast tubes 14. Structurally they should not be less than three of their diameters apart. Six is better. Likewise, the apertures 15 may be distributed around the circumference of the ballast tubes 14, typically being perforated along the bottom, and at 90 degrees thereto along the sides, and opposite thereto along the top center line along the ballast tube 14. Comparatively larger apertures reduce strength but can increase form drag.

The tubes 12, 14 are secured to one another by struts 16 or braces 16. Typically, the struts 16 are also long tubes 16 of the same material (e.g., high density polyethylene) as the float tubes 12 and ballast tubes 14. The struts 16 are typically welded by heat welding to fit with the principal tubes 12, 14. A diameter of a nominal 12 inches for the struts 16 has been found satisfactorily. Certain of the struts 16 extend straight between adjacent tubes 12, 14. Others of the struts 16 extend at an angle, typically at an angle corresponding to principal stresses (about 45 degrees and 90 degrees) with respect to a center line of an associated tube 12, 14 supported thereby.

In the illustrated embodiments, the struts 16 are provided with apertures 17 to permit entry of water 37. The apertures 17 need not be particularly large, and have been found suitable at a dimension of from about one to about three inches. A diameter of from about one to about two inches has been found completely suitable. It has been found advisable to form larger apertures 15 in the ballast tube 14 in order to provide additional fluid drag in the process of operation of the breakwater 10.

The wave attenuator system 10 or breakwater 10 is secured by an anchor 18 of any suitable type and a tether 20 running between the anchor 18 and one or more of the tubes 12, 14. U.S. patent application Ser. No. 14/267,612, filed May 1, 2014 for CORROSION-AND-CHAFING-RESISTANT, MOORING SYSTEM AND METHOD is incorporated herein by reference and contains a detailed description of various suitable embodiments for an anchor 18 and tether 20.

The cavities 22 in the float tubes 12 operate as air chambers 22 to maintain the floats 12 riding high or at any suitable distance above the surface 36 of the water 37. As a practical matter, the cavities 23 and the struts 16 are alternately filled and evacuated of water to some extent to increase buoyancy or mass, acting opposite each other. That is, due to the apertures 17 and the struts 16, water may enter and leave the cavities 23 and the struts 16.

The wall 24 around each of the tubes 12, 14 may be of any suitable size, but has been found to be adequate at the manufacturing nominal size manufactured in conventional nominal 24 inch high density polyethylene tubing. It has been found suitable to leave the walls 24 as manufactured. Engineering calculations indicate suitable strength, durability, and longevity in service.

One will note a guard 26, typically formed of high density polyethylene tubing, such as about an eight inch nominal diameter tubing. The guard 26 is welded to each of the float tubes 12 in order to protect ports 28a, 28b.

The ports 28a are short, penetrating into the wall 24 of a float tube 12 in order to receive air or water therein. Meanwhile, the ports 28b are secured to include or communicate with a tube 29 extending down through each of the float tubes 12 toward the bottom surface thereof in order to purge water therefrom. By adding air through the port 28a, the cavity 22 of each float tube 12 may be filled with air while the stand pipe 29 or tube 29 empties water from within the float tube 12 and passes it outside thereof through the port 28b. The amount of air or water in each float tube 12 may be selected for best performance.

Each of the float tubes 12 and ballast tubes 14 is provided with a flange 30 at one end 32a thereof. The opposite end 32b is simply sealed with an end wall 32b. As a practical matter, the end walls 32a, 32b provide stiffening of the cylindrical tubes 12, 14, thus adding structural integrity and stiffness. Meanwhile, the end walls 32a, 32b on the float tubes 12 seal the tubes 12 in order to render them sealed and buoyant on the surface of the water.

The tether 20 may be threaded through a sleeve 34 of polyethylene tubing 34 that wraps around one or more of the tubes 12, 14. The sleeve 34 provides chafing protection for the tether 20. Typically, the tether 20 may be a suitable marine rope of a synthetic polymer (e.g., nylon, polyester, and polypropylene) that has long life when subject to the attack of marine organisms, chemicals, biological activity, and so forth. Accordingly, the sleeve 34 provides a long term chafing protection against the abrasion of the tether 20 on the outer surface of any of the tubes 12, 14, to which the tether 20 may be secured.

Multiple segments 10 or unit systems 10 may be concatenated or connected. Typically, the systems 10 may be made in units 10 or segments 10 of about 60 feet in length. Two of these 10 may be secured together to make another single longer assembly 10 by securing fasteners 31 through flanges 30 on the ends 32a of each of the tubes 12, 14. The effect then is to provide a longer assembly 10 or wave attenuator system 10 of about 120 feet in length, having three tubes 12, 14 forming an isosceles triangle. The bottom tube 14 acts as the ballast tube 14 providing damping of motion of the system 10 in response to wave action.

Referring to FIGS. 11 through 16, while continuing to refer generally to FIGS. 1 through 16, the system 10 operates by floating on the surface 36 or at the surface level 36 of a body of water 37 defined as extending between the water level 36 on the top thereof and a floor 38 or bed level 38 therebelow. The bed level 38 represents an upper surface 38 of a sea bed 40. The sea bed 40 or floor 40 may be a concrete bottom, natural rock, soil, or whatever else may underlie a body of water 37.

In the illustrated embodiment, an anchor 18 may be fixed near but well below the surface 38 of the bed 40. Here, the illustration shows an anchor 18 that has been embedded within the sea bed 40 below the floor 38 or bed level 38. The tether 20 extends continuously from the anchor 18 up through the water 37 to engage one or more of the tubes 12, 14 of the breakwater 10. The tether 20 may secure by a bowline knot, a re-woven loop or the like as understood in the marine arts.

Figure 11:
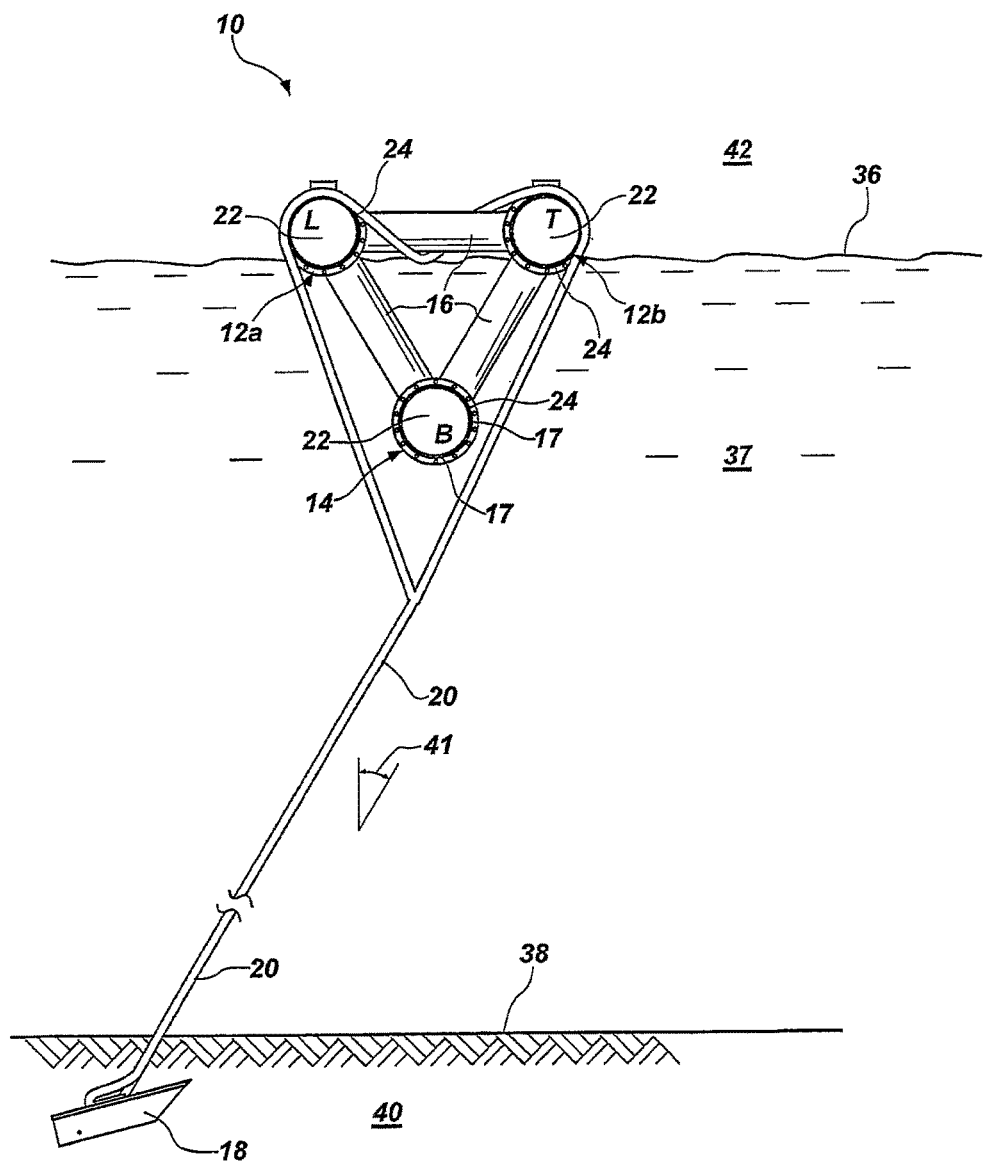
FIG. 11 is a front elevation view of a breakwater in accordance with the invention, secured to the sea bed by a tether over both top tubes or float tubes.
Figure 12:
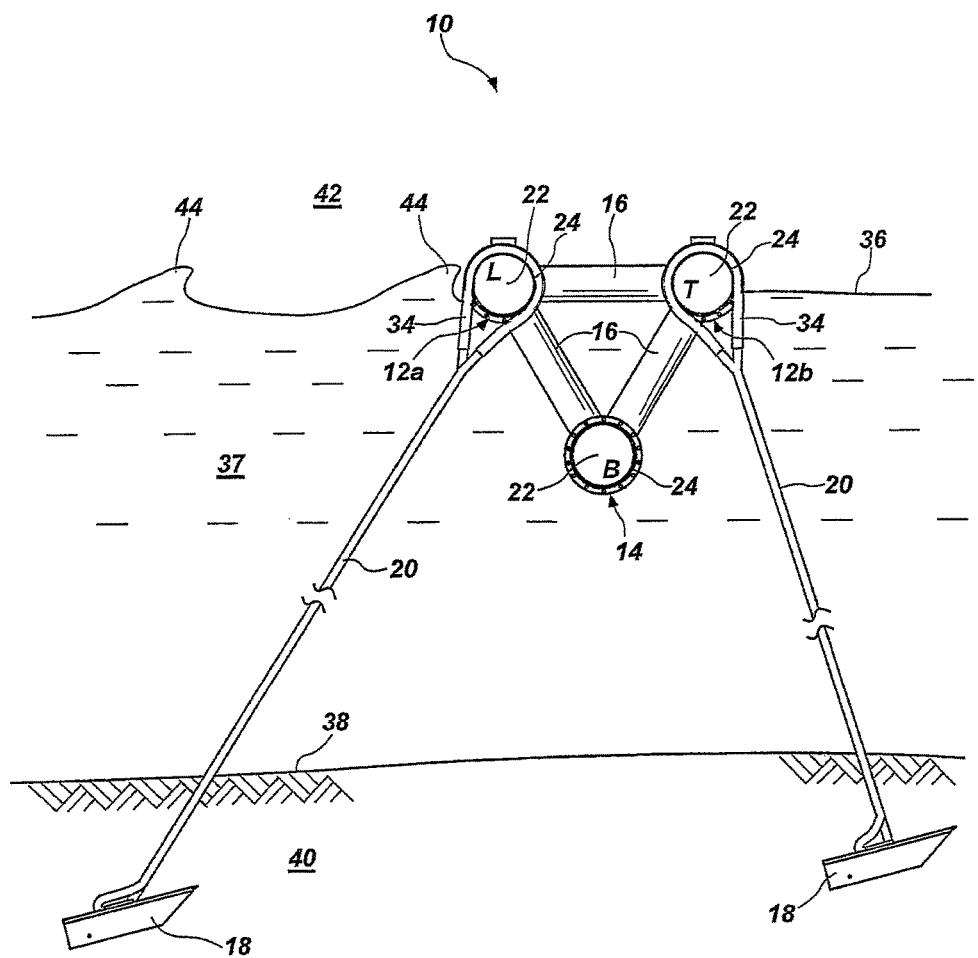
FIG. 12 is an end elevation view of an alternative embodiment of a tethering system securing only a leading float tube.
Figure 13:
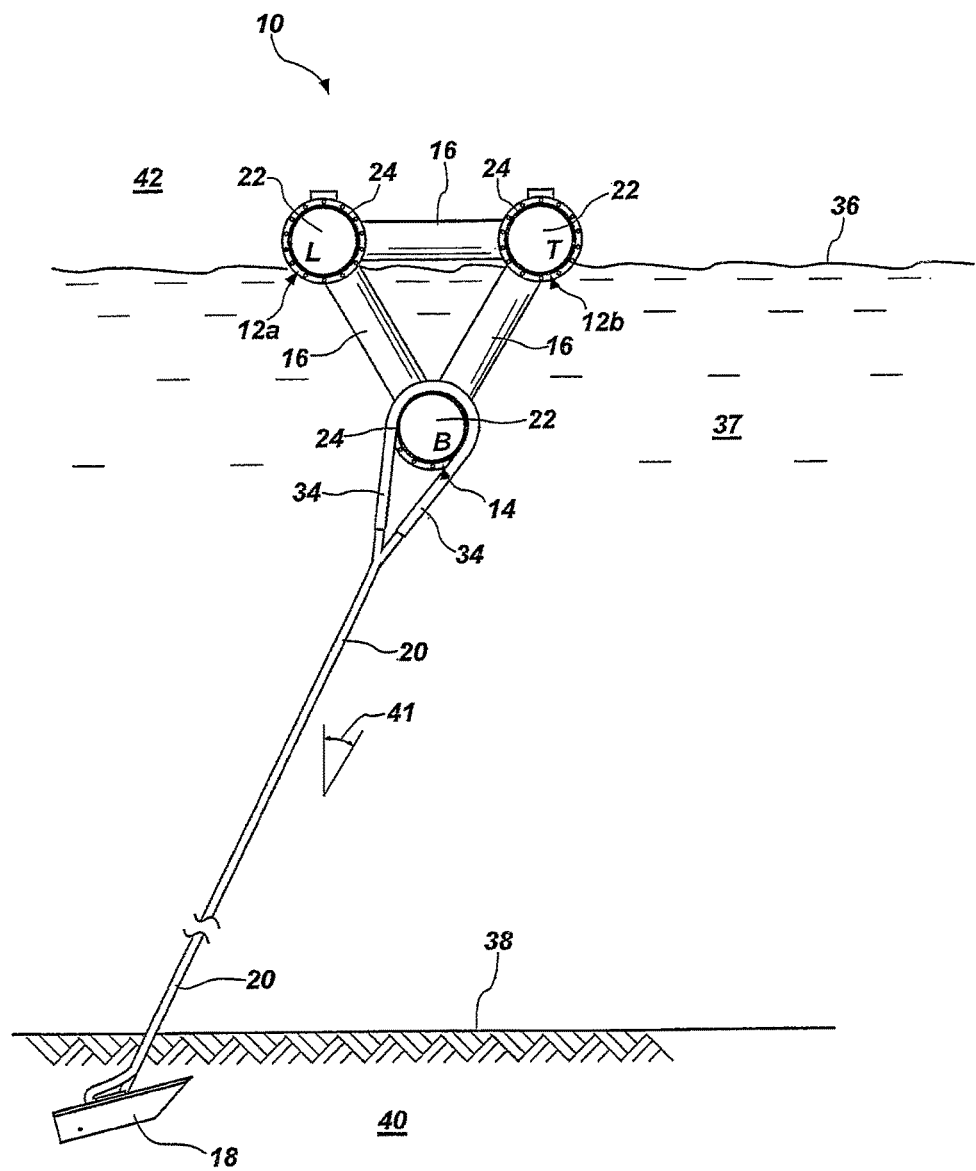
FIG. 13 is an end elevation view of a breakwater system relying on tethering of the bottom or ballast tube portion thereof.

Referring to FIGS. 11 through 13, various embodiments of the tether 20 may engage one or more of the tubes 12, 14. One advantage to the embodiment of FIG. 1 and that of FIG. 11 is that the float tubes 12 are both permitted free motion on the surface 36 of the water 37 except to the extent that the tether 20 may restrain them with respect to the anchor 18. The embodiment of FIG. 11 would cause more wear between the sheath 34 or sleeve 34 against the tubes 12 as a result of relative motion.

Typically, the tether 20 will extend at an angle 41 with respect to the floor 38 as a result of action of the waves tending to push the breakwater 10 toward shore. Whether the angle 41 is measured with respect to a vertical direction rising from the floor 38, or with respect to the floor, is a matter of arbitrary choice. However, the resulting angle 41 that the tether 20 deviates from vertical provides a vector of force on the float tubes 12.

For example, when the level 36 of the water 37 rises with a wave, the tether 20 of FIG. 11 may draw the tubes 12 laterally 11b to be more directly over the anchor 18. The tension in the tether 20 acts as a vector drawing the breakwater 10 toward the anchor 18. Mathematically, that force vector does not change value substantially, but direction.

It is resolved into a component parallel to the surface 36 of the water 37, and an orthogonal component in a vertical direction 11a. In FIG. 1, the force vectors do not change direction, due to permanent constraint. Force values, however change substantially in operation. Wave action causes pulling by buoyancy forces and lateral 11b as well as vertical 11a momentum.

The directions 11 identify various directions 11 with respect to the system 10. Herein, a trailing letter is a specific instance of a reference number. The direction 11a is nominally vertical, while the direction 11b is laterally or horizontally orthogonal thereto. Meanwhile, the direction 11c is longitudinally orthogonal to both the directions 11a and 11b, and extending along the length or longitudinal axis of the tubes 12, 14.

Referring to FIGS. 11 through 16, and FIGS. 1 through 16, generally, the directions 11 may represent up or down, forward or backward directions, as needed. However, one may think of the direction 11a as the vertical direction of rise and fall of the apparatus 10 in response to waves, with the lateral direction 11b being the back and forth, shoreward and windward, direction with the wave and against the wave that the apparatus 10 may move.

Similarly, the system 10 may rotate or roll about any of the axes 11a, 11b, 11c. Thus, the breakwater 10 will tend to roll in the direction 11e as a wave strikes the leading float tube 12a and will then counterrotate in the direction 11d as the wave passes the float tube 12a and lifts the float tube 12b. Of course, one may speak of the leading float tube 12a as that which strikes or receives the wave first, and the trailing float tube 12b as that which receives the remainder of the wave thereafter.

One may see that a float tube 12a in rising with a wave 44 on the surface 36 of the water 37 will necessarily rotate the overall structure of tubes 12, 14. As the wave 44 passes the leading tube 12a also identified by an L, juxtaposed to the trailing identified by the letter T, a rocking motion will persist forward 11d and backward 11e with respect to the breakwater 10 facing in its own "forward" direction 11b toward the incoming wave 44 advancing "forward" 11a in its motion (see FIG. 1). Any time the system 10 tries to lift with a wave 44, several forces act. Those forces act to redirect energy, momentum, and material (water 37) in various directions that randomize the influence of a wave 44. The result is turning mechanical energy into thermal energy heating (ever so slightly) the water 37 by mixing vigorously.

One may note that the connection scheme for the tether 20 about the float tubes 12a, 12b in FIG. 11 will induce a somewhat different dynamic effect from that of the example of FIG. 12. For example, the comparatively lighter of overlying air 42 above the surface 36 of water 37 provides negligible resistance to waves 44. Waves 44 rise as the floor 38 rises, momentum shifts, and the water 37 finds it easier to move up into the air 42 rather than contend with the resistance of surrounding water 37.

In the embodiment of FIG. 1 and FIG. 12, the tube 12a will rise first, rotating with respect to the tube 12b, since a tether 20 is secured about each of both the leading tube 12a and trailing tube 12b. The influence of the ballast tube 14 remains effectively the same. That is, it must move through the water 37 in order for either of the tubes 12a, 12b to move. To move within the vertical plane (the page) illustrated in FIG. 12, the tube 12a must lift on the wave 44. The trailing tube 12b does not follow the same magnitude of motion as the wave 44 is redirected.

Referring to FIG. 13, securing a tether 20 about the ballast tube 14 permits rocking or rotating by the ballast 14 and float tubes 12a, 12b. However, if double tethers of FIG. 12 are used on the ballast tube 14, to keep it in place, the tether 20 resist the necessary rocking action and fails to operate well. Thus, it has been found suitable to use a configuration of FIGS. 1 and 12, although the configurations of FIGS. 11 and 13 may also be used.

Alternative configurations may also be used, including securing the tether 20 to the struts 16, to an anchor point or points along the tubes 12, 14, or the like. However, it has been found effective to minimize tight (comparatively small, on the order of a few radii diameters of the tether 20) radii in loops of the tether 20, and to eliminate metal.

In the illustrated embodiment, no metal is required within the system 10. In certain embodiments, the fasteners 31 for securing the flanges 30 together may be formed of metal for expediency. Metal provides substantial strength per unit of cross-sectional area, and may be fabricated from suitable materials, such as stainless steel, that resist corrosion. As the only metallic component, the fasteners 31 cannot set up di-metallic galvanic cell promoting corrosion.

Figure 14:
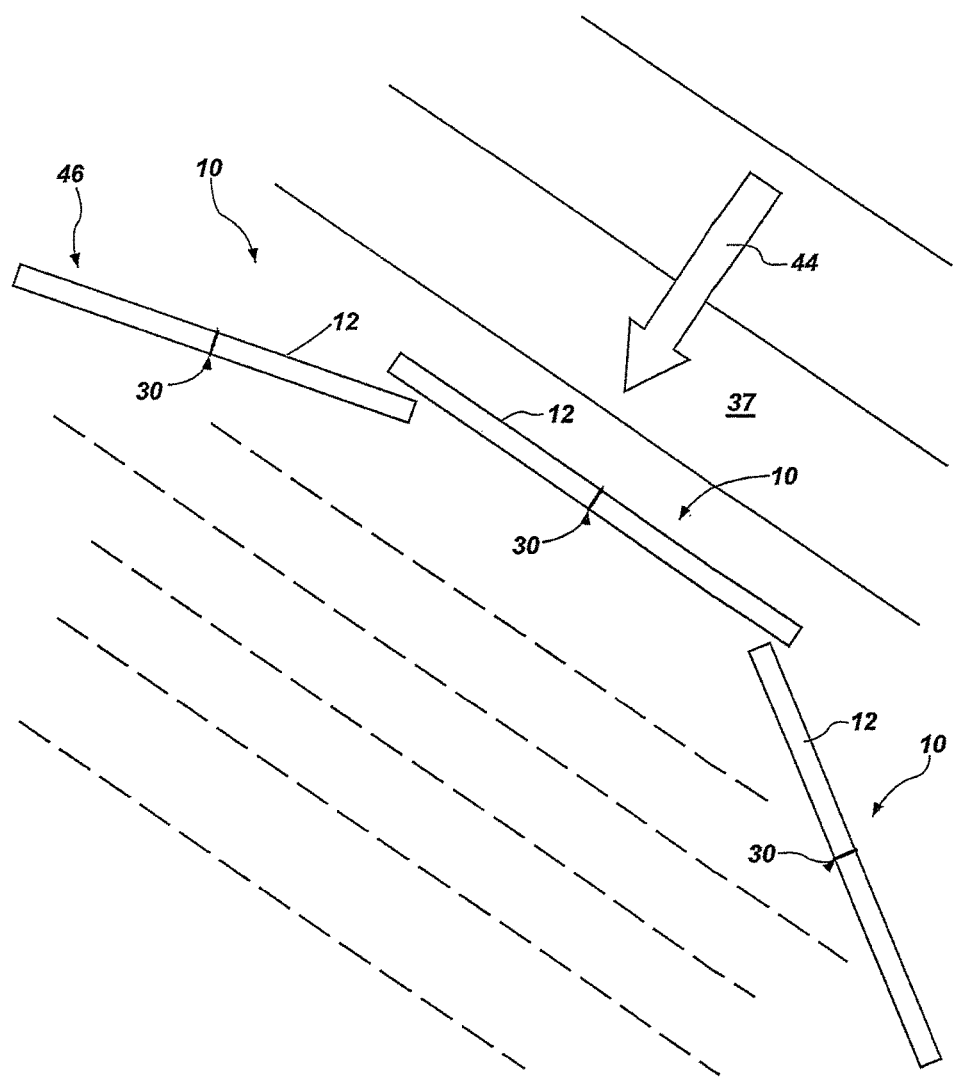
FIG. 14 is a perspective view of an installation relying on several breakwater unit assemblies deployed in accordance with the invention by being arrayed across a body of water by such as a bay or harbor.

Referring to FIG. 14, a wave 44 may encounter an array 46 of the systems 10 in accordance with the invention. In one manner of speaking, the tubes 12, 14 are also configured in an array of three tubes. Likewise, an array 46 may represent several breakwaters 10, each anchored by suitable tethers 20, and assembled in pairs secured by intermediate flanges 30. As a wave 44 approaches, an extensive region of water 37 may be protected by the array 46 of attenuators 10 or breakwaters 10. Thus, one may speak of a breakwater 10 as the entire array 46, or a single unit 10, or some intermediate combination 10 thereof.

Figure 15:
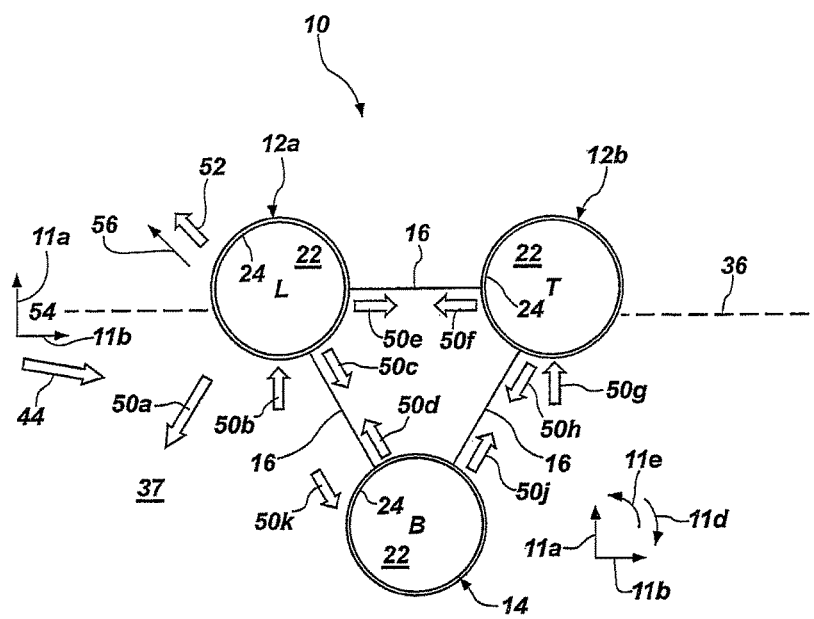
FIG. 15 is an end elevation, schematic view of a breakwater in accordance with the invention illustrating the forces acting on the various tubes thereof.
Figure 16:
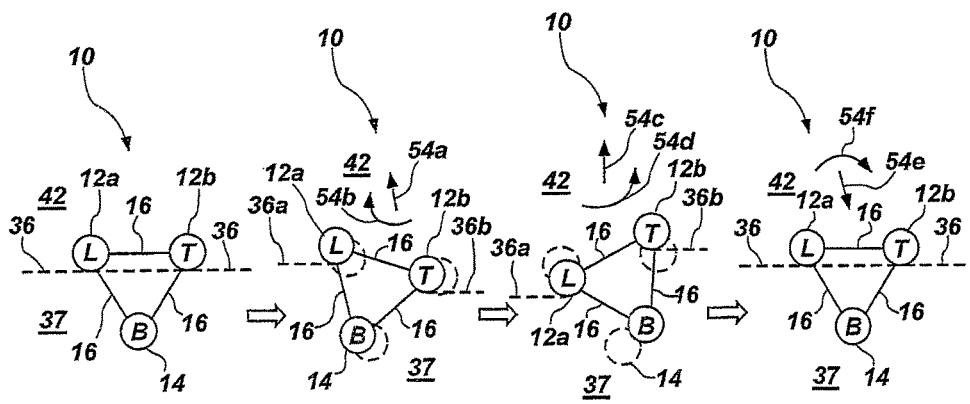
FIG. 16 is a schematic diagram of the operational motion of a breakwater in accordance with the invention as it attenuates a wave.

Referring to FIGS. 15 and 16, while continuing to refer generally to FIGS. 1 through 16, a system 10 in accordance with the invention maintains a very sophisticated and effective pattern of movement. Materials floating on a surface 36 of a body of water 37 are common. Buoys and vessels, from dinghies to ocean-going ships, float on the surface 36 of various bodies of water 37. Similarly, conventional breakwaters 10 may involve platforms of floating materials, such as logs, or fixed barriers, such as sea walls, rock embankments, and so forth.

Always the wave energy and momentum (speaking of Newtonian physics and the laws of motion as defined by Newton as understood in the sciences of physics and engineering) demonstrate the transfer of energy and momentum from waves 44 to fixed or moving masses along the surface 36 of water 37. Redirecting mechanical energy (force times distance) or power (force times velocity) requires redirecting momentum (mast times velocity), which necessarily requires redirection of forces and pressures (force per unit area). Meanwhile, redirection requires structures capable of supporting the tremendous energies and forces of waves 44. Large forces, large momentum, and large size imply large costs, extensive time, and other artifacts of construction thereof.

In an apparatus and method in accordance with the invention, a very sophisticated and complex motion occurs in the breakwater 10 based on an almost rudimentary triangular envelope.

For example, in the illustrated embodiment, a leading tube 12a is identified by the letter L while a trailing tube 12b is identified by the letter T. A ballast tube 14 identified by a letter B completes the array 10 of tubes 12, 14. The struts 16 have been idealized schematically as straight lines. In the illustrated embodiment, various forces occur. Upon the advance of a wave 44 toward the assembly 10, the wave 44 effects motions in each of the tubes 12, 14.

For example, motion 54 in the vertical direction 11a results from the swell or the rise of a wave 44 as it advances. Meanwhile, the wave 44 is traveling and therefore contains energy and momentum directed in the direction 11b. The result is a buoyant force 50b tending to lift the tube 12a or the leading tube 12a. Likewise, the tethers 20 each exert a force 50a tending to restrain the leading tube 12a and trailing tube 12b toward their anchors 18. The forces 50c, 50d that may exist within the strut 16 between the leading tube 12a and the ballast tube 14 also contribute forces restraining the leading tube 12a because of fluid drag on the ballast 14 whenever it moves relative to the water 37. By the same token, forces 50e, 50f within the struts 16 between the leading tube 12a and the trailing tube 12b also contribute to the force balance.

The net effect is a resultant force 52 that acts to move the leading tube 12a into a net effective direction 56 of the leading tube 12a. Any motion 56 or direction 56 of movement in response to the resultant force 52 on the leading tube 12a results in a resistance force 50c on the tube 12a exerted by water 37 surrounding itself and by the ballast tube 14 and struts 16 being dragged through the water 37. The leading tube 12a cannot ever move without moving the interconnected trailing tube 12b, ballast tube 14, and intervening struts 16.

One can immediately see that the forces 50d, 50j on the ballast tube 14, imposed by the struts 16 extending toward the leading tube 12a and trailing tube 12b, respectively, tend to move the ballast tube 14 against a resistance force 50k. The resistance force 50k is applied as a "form-drag" of the water 37 acting on the ballast tube 14. Form drag occurs in response to any motion in any direction. Thus, any tendency of the ballast tube 14 to move in the direction 56 with the lead tube 12a will be resisted by force 50k in the direction illustrated. However, the force 50k will be directed opposite any movement through the water 37.

Thus, translation vertically in the direction 11a, horizontally or laterally in the direction 11b as well as in rotation 11d, 11e about any longitudinal axis of any of the tubes 12, 14, or any central axis of the assembly 10 will result in churning of the water 37 and resistance to any movement therethrough by the tubes 12, 14.

Referring to FIG. 16, the progression of motion of the assembly 10 is illustrated through various phases. Progressing from left to right through this schematic illustration, one may envision a system 10 having a leading tube 12a and trailing tube 12b above a ballast tube 14. Upon arrival of a wave 44, the level 36 of the water 37 rises below the leading tube 12a. The result of the resultant force 52 imposed by a combination of the buoyance of the tube 12 on wave 44, fluid drag, and the tether 20 is a rising and pulling back against the anchor 18 of the leading tube 12a. Meanwhile, the lifting of the leading tube 12a results in rotating the assembly 10. Such motion results in necessarily displacing the trailing tube 12b sitting at a lower level 36 of the water 37, and correspondingly displacing the ballast tube 14 against the resistance of surrounding water 37.

Thus one sees the net translation motion 54a of the center of mass that may be a net result, and the rotation 54b about some axis of rotation. As the wave 44 progresses to the right in the schematic illustration, the level 36a of the water 37 under the leading tube 12a drops as the swell of the wave 44 tends to lift the level 36b of the water 37 under the trailing tube 12b. This motion reverses the direction of a rotation 54d, and also may result in a rise 54c. As a practical matter, any lift 54a, 54c in any rotation 54b, 54d will necessarily be a result of the vector of all forces 50 operating on the system 10.

Eventually, the weight of the system 10 and the receding of the level 36 of the water 37 to a flat and level surface 36 results in the leading tube 12a and trailing tube 12b once again dropping 54e and rotating back 54f to their original equilibrium position. At each point of motion, each of the tubes 12a, 12b, 14 thrashes through water 37 for every motion required therethrough.

Drag factors may be found in standard textbooks identifying the form drag or fluid drag of various fluids at various densities as they pass over inner or outer surfaces of solid structures. Accordingly, the tubes 12, 14 present form drag to the passing wave 44, churning and thrashing the water 37 in response to their motions 54 resulting from the balance of resultant force 52 on the system 10 in each of its components 12, 14, 16 passing through the water 37.

In experiments, it has been found that an apparatus and method in accordance with the invention is very effective at reducing the momentum, energy, crest height, and deleterious effects of waves 44 progressing toward shore lines and shore-bound structures.

Referring to FIGS. 1 through 16, several principles have been found significant in providing a suitable breakwater 10. Initially, the size and spacing of the tubes 12, 14 appear to be significant. For example, it has been found that the diameter of the floating tubes 12 should be of about the same size or order of magnitude as the typical swells 44 or waves 44. A wave 44 expected should typically be not more than about two or three tube diameters in height between crest and trough of a wave 44. This assures that a significant amount of any cresting wave does not pass over the breakwater 10 upon breaking of the wave 44.

Another feature is the spacing between the floating tubes 12. The distance between tubes should also be about two diameters. A greater distance is satisfactory, but changes performance. A lesser distance tends to leave problems with residual water passing over the entire breakwater 10, interferes with the rocking or rotational component of motion, and reduces the leverage that the ballast tube 14 can exert against the float tubes 12.

Also, the fill amount in each of the float tubes 12 has been found to be a significant factor in engagement of the ballast tube 14. The specific gravity (an engineering and physics term, well understood in the art, and indicating the ratio between the density of a particular material compared to the density of water as the denominator) of the high density polyethylene (HDPE) embodiment of the apparatus 10 is around 0.92 to about 0.95. Typically, it seems to be in the range of about 0.93 to 0.94. This means that the HDPE will actually float in water, but barely. It is slightly less dense than water, but only by less than ten percent.

The breakwater 10 can still function with the float tubes 12 containing a substantial amount of water. Filling the float tubes 12 with a fraction of water (any amount is feasible) typically from about one third to about two thirds provides good flotation and increases the overall mass of the float tubes 12. Thus, the tube 12 on a swell 44 or wave 44 does not tend to have as much buoyancy. This results in less force to lift the float tubes 12 with the swell 44, and to drag with them the ballast tube 14 through the water 37. This means that the float tubes 12, themselves, represent an obstruction that must be faced by an oncoming wave 44. To the extent that the float tubes 12 have a greater fill or fraction of water inside them, they can no longer float as easily upon the top of the rising wave 44. This results in the breakwater 10 operating more like a rigid emplacement, with less float tube 12 response.

However, even with water inside the float tubes 12, greater than one third of the volume thereof, the pushing by the wave 44 or swell 44 against the float tubes 12 still results in rotation or rocking of the assembly 10. The corresponding churning of the water below the swell 44 arises from being thrashed by the ballast tube 14.

The ballast tube 14 operates according to the principles of form drag of a solid object in a fluid. Drag force is proportional to half the density multiplied by the presented area and velocity squared. Constants of proportionality depend on the shape of the body moving in a fluid. They are available as correlations to a value of Reynolds number. To a certain extent, this may be modified by some passage of water through the apertures 15 in the ballast tube 14. Both can be modeled by principles of fluid mechanics to provide the net fluid form drag on the ballast tube 14. Drag resists it in response to its need to rock. Rocking occurs in reaction to the driving of the float tubes 12 by oncoming wave 44 or swell 44.

As to the spacing between the float tubes 12, vigorous wave 44 approaching the point of breaking, as that term is understood in the marine arts, a wave 44 will often be forced to break by the resistance to motion imposed by the leading float tube 12a. Again, the spacing between the float tubes 12 or top tubes 12 is effective to receive any wash or crest passing over the lead tube 12a. The trailing tube 12b then provides a similar resistance to passage by the water from the crest, thus encouraging it to flow down between the tubes 12.

Tethering has been experimented with in several embodiments. In all the illustrated embodiments, a tether 20 is not rigid. That is, for example, the breakwater 10 is not fixed to a wall, rigidly fixed in space by any other superstructure, or the like. The breakwater 10 is always permitted to move in response to oncoming waves 44. Several embodiments have been experimented with, teaching much about the hydrodynamic response of the breakwater 10 in a body of water 37.

The float tubes 12 are urged by the rising water level 36 of an advancing wave 44 to float upward. Moreover, the cyclic flow and ebb of the oncoming wave 44 also encourage a shoreward and windward motion 11b or lateral 11b motion in addition to the vertical 11a rise and fall of the top tubes 12 in sequence. The leading tube 12a first rises, followed by the trailing tube 12b. Meanwhile, the trailing tube 12b will typically not respond as dramatically to flotation forces, nor the dynamic impact forces of an oncoming wave 44. This occurs because the leading tubes 12a already meets the forces, and initially breaks up the direction of flow of the oncoming wave 44, and redirects the water, forces, momentum, and energy thereof. The trailing tube 12b and ballast tube 14 steady the leading tube 12a at all times.

Tethering may be done in one of several ways. The currently contemplated embodiment of FIG. 1 may involve tethers 20 angling down both shoreward and windward at a modest angle of from about 50 to about 20 degrees. Typically, an angle from about 30 to about 45 degrees from horizontal has been found a reasonable compromise.

For example, a certain downward resistance force is presented by the tethers 20, as well as a lateral force. The force component in the vertical direction 11a is significant in resisting ready flotation by the top tubes 12. Likewise, forces in the lateral direction 11b also stabilize against the flow and ebb forces of a wave 44. Thus, if each is to be resisted equally, then a 45 degree angle is most appropriate. On the other hand, additional length of tethering 20 may result in reducing that angle. Herein, that angle is defined with respect to the horizontal direction 11b, such as a seabed level 38.

In most embodiments, the double tethering in both of the lateral directions 11b (e.g., ebb and flow, windward and shoreward, or windward and leeward) and the downward direction 11a is important on each of the free ends 32b. However, the typical length of one assembly of a breakwater 10 is about 60 feet. Accordingly, when two are connected together by their flanges 30, they represent a length of about 120 feet. To avoid bending, it has been found suitable to tether the top tube 12a near the flanges 30 with at least one other tether 20 providing resistance or force applied to the top tube 12a (leading tube 12a) in the windward direction.

It has been found that the use of a tether 20 made of a twisted or braided polymeric rope, such as nylon, polyester, or the like provides a certain useful amount of elasticity. Other elastic members may be interposed along or as part of the tether 20. The effect of the elasticity in the tether 20, from either source (rope, elastic member, mass of system 10, air, etc.) is an additional resistance that the force and momentum of a wave 44 must work. Thus, the resistance to rocking of the breakwater 10 occurs as a result of the mass of the top tubes 12, including any enclosed water, the mass of the ballast tube 14, form drag of fluid over and through the system 10, and the forces exerted by the tethers 20 in the vertical direction 11*a* as well as the lateral direction 11*b*.

Referring to FIGS. 1 through 16, while also focusing on the views of FIGS. 3 and 4, one will notice that a void fraction exists as any wave 44 passes in a vertical direction 11*a* through the maze of top tubes 12, struts 16, and the ballast tube 14. Similarly, referring to FIGS. 5 and 6, a void fraction and an interference fraction (occupied space) are presented to an oncoming wave 44 approaching from a lateral direction 11*b* or horizontal direction 11*b*. The effects are different.

The effect of encountering a wall around a circular cross-section or a tubular (e.g., right, circular cylinder) shape is that no area is directly presented normal (perpendicular) to the tubes 12, 14 and struts 16. Theoretically, only a line is normal to any direction of approach to the outer surface of a round tube. In every event, the waves 44 must strike obliquely the surface area of the outside surface of any of the tubes 12, 14 and struts 16. This deflects the water mass, momentum, and energy away from its original direction of travel. It immediately induces a new direction and path calculated to cause interference between the various redirected flows.

As a result, momentum is taken out of the principal directions of the vertical direction 11*a* of the rising swell 44, and the horizontal direction 11*b* or lateral direction 11*b* of its progress toward the shore behind (beyond) the breakwater 10. Meanwhile, the net momentum is not completely reversed. In fact, it is hardly reversed at all except for splashing and collisions.

If the wave 44 were to strike a solid wall, all momentum must be transferred into the wall, and a certain proportion of that momentum that was not dissipated would then be thrust out away from the wall. Here, the momentum is directed obliquely away from the obstructing tubes 12, 14 and struts 16, toward the openings therebetween.

The void fraction is the fraction of unobstructed area that can be seen passing through the maze of tubes 12, 14 and struts 16. However, considering only void fraction is informative, but not complete. The void fraction will allow the passage of a certain amount of the water 37 from a wave 44. However, even that water 37 has been influenced, mixed, struck, and redirected by the water 37 flowing around each of the tubes 12, 14 and struts 16. The apertures 17 in the struts 16 are calculated to be comparatively small, and may actually be neglected in any hydrodynamic analysis.

The apertures 15 in the ballast tube 14 are considerably larger, amounting to approximately one sixth the diameter of that ballast tube 14. Thus, they may be ignored in some analyses, but may also be accommodated by analyzing their tortuous flow path. However, the resistance to flow, unless apertures 15 are directly opposite one another to permit flow through the ballast tube 14 in a lateral direction 11*b* or even a vertical direction 11*a*, will be substantial, and may properly be ignored in a first order analysis of the fluid dynamic drag of the water 37 passing over or around any particular member 12, 14, 16.

The triangulation of the tubes 12, 14 in the illustrated embodiment forms an isosceles triangle. It is not required to have an isosceles triangle. However, one must realize that anything other than an isosceles triangle changes the net leverage of any particular tube 12, 14 with respect to any other tube 12, 14. For example, if the struts 16 between the top tubes 12 and the ballast tube 14 are longer than those between the float tubes 12, than the ballast tube 14 has greater leverage in resisting the natural rocking.

The rocking is important, and is substantial. Even in small, modeled, laboratory experiments, an attempt to apply force to the ballast tube 14 in order to steady it against rocking was completely ineffective. The energy of the wave 44 is applied to every tube 12, 14 the breakwater 10, and the rocking and churning will not be denied. However, that rocking is resisted at all times by the form drag of the surrounding water 37 against all tubes 12, 14, 16 moving therein.

The planes defined by the center lines of each set of struts 16, passes through the center line of each pair of adjacent tubes 12, 14. One will see that even these planes are oblique to the oncoming wave 44. In addition, only the front most contact line of any tubular member 12, 14, 16 could ever be normal to the direction of a wave 44. Thus circular tubes 12, 14, 16 divide and redirect the water, rather than stopping or reversing it.

The void fractions or open spaces seen through the maze of members 12, 14, 16 are not required. However, a solid or uninterrupted surface would defeat several beneficial functions. Tubes 12, 14, 16 provide redirection of water and form drag against such relative motion. Thus, to balance forces to effective levels, redirected water needs a path that does not reverse.

In order to obtain the proper operation, it has been found that a diameter of each of the tubes 12, 14 should be related to the maximum expected wave height, crest to trough. A range of from about one wave height to about five works, and three wave heights has been found suitable, economical, and effective. Meanwhile, a diameter of each of the struts 16 has been found to be best suited for both mechanical and hydrodynamic purposes at about one quarter to about three quarters of the diameter of the operational tubes 12, 14.

A diameter of the struts 16 equal to about half the diameter of each of the tubes 12, 14 has been found highly suitable, providing a void fraction that provides a workable and effective void fraction, adequate rocking, and excellent effectiveness at breaking waves, while providing structural integrity of the entire breakwater 10, its structural connections, anchors 18, and tethers 20. Decreasing the void fraction can be expected to cause more momentum transfer of "redirection" into the breakwater 10. Eventually this risks potential damage to tethers 20, anchors 18, and structures of the breakwater 10.

In the illustrated embodiments, it has been found advisable to provide a one-hundred-percent-coverage welding by thermal welding for all contacts between the tubes 12, 14 and the interconnecting struts 16. This has been cohesive welding based on a melted, thermoplastic polymer substantially identical to the base material of the other members 12, 14, 16.

As a practical matter, it has been found suitable to provide certain struts 16 that pass directly and orthogonally with respect to the longitudinal direction to each of the tubes 12, 14. Initially, these provide inter-tube spacing initially in a straightforward manner, so that the diagonal struts 16 can then be installed. They also provide a certain amount of support by way of tensile and compressive force transfer directly between the tubes 12, 14. They do not provide as good longitudinal support as the diagonal struts 16 in operation.

In the illustrated embodiment, the system 10 is virtually corrosion proof. No galvanic cells are set up. No differences in metallic constituents are present. It has been found that the flanges 30 are best secured together by fasteners 31 formed of nonreactive, non-corroding, stainless steel. All other connections and members, from the anchor 18 up through the tether 20, and including all the other structural members 12, 14, 16, are formed of polymers. The polymers (such as HDPE) are nonreactive with sea water or normal constituents of fresh water or salt water.

In the illustrated embodiment, virtually no flow propagated by a wave 44 is allowed escape. The illustrated embodiment was installed in certain locations where the maximum expected wave height was about five feet. The two-foot diameter of the tubes 12, 14, coupled with the eight foot (e.g., greater than one wave height) outer dimension across any base or side of the triangle formed by the tubes 12, 14. This relation assured that the effect of the wave 44 was intercepted directly by at least one of the members 12, 14, 16.

Moreover, even any fraction of flow that may persist below the surface 36 of the water 37 deeper than the position of the ballast tube 14, is nevertheless affected by the vortices and churning occasioned by movement of the ballast tube 14. Thus, there is substantially no "free stream" (e.g., unperturbed, distant) flow at the wave velocity in either the vertical direction 11$a$ or the horizontal direction 11$b$ or lateral direction 11$b$ without a system width of (across) the breakwater 10. Instead, all the surrounding water 37 is subjected to impact, change of direction, mixing, and so forth occasioned by the rocking of the breakwater 10 in the waves 44.

As a practical matter, one will notice that forces applied to the breakwater 10 are triangulated by the tubes 12, 14 and struts 16. Thus, the system 10 is very stable. Forces are transferred in tension and compression directly. The wall thicknesses of the materials of the members 12, 14, 16 may be selected at nominal values for such structures and still provide adequate stiffness, strength, section modulus, and so forth as needed for the mechanical properties thereof.

The maximum or minimum size at which a breakwater 10 may still successfully operate appears to be within an order of magnitude, and most likely within half an order of magnitude of the wave height. That is, diameters of the tubes 12, 14 should typically be within one third to one half an order of magnitude of the maximum wave height from crest to trough.

A void fraction in the projected area normal to a wave has been found to be adequate in the range of about twenty five percent to about sixty six percent. Higher void fractions will simply reduce the effectiveness at redirecting all of the water from the wave 44. One function is redirection without having to absorb the momentum and energy into the breakwater 10. Those properties need to be redirected as randomly as possible. The resulting mechanical energy is thus reduced to heat by "mixing."

Smaller void fractions will put greater stress on the anchors 18 and tethers 20, and may result in more momentum and energy transferred to the breakwater 10, rather than redirecting the energy and momentum of the waves 44 into a churning effect. The fundamental charter of a breakwater 10 is to reduce the momentum and energy striking the shoreline or shore structures.

A wave attenuation system (WAS) 10 illustrated in the accompanying FIGS. 1 through 16 is designed to reduce the amplitude of wind-generated surface waves in marine, sea and fresh water, environments. Wind-generated surface waves 44 have wave periods (time of passage from crest to crest) that range from less than 0.1 seconds to 30 seconds but may range up to 5 minutes. In the areas where WASs 10 are being tested, typical wave amplitudes (height from trough to crest) of wind-generated surface waves 44 vary from mere inches (ripples) upward to amplitudes of 5 to 6 feet. Wavelengths (distance from crest to crest) are from about 25 feet, for small waves on the order of 1-foot high, to 100 feet for 5-ft high waves. The typical installation for a WAS 10 is contemplated to be in the nearshore environment as a means of protecting marinas and boats, shoreline structures, and other human-made floating and shoreline features from wave damage. It functions as an alternative to other types of breakwater systems, such as floating logs and rock, earthen, and concrete berms, and various wood, rock, or concrete sea walls.

The WAS 10 in experiments was constructed almost entirely of high-density polyethylene (HDPE) for its high strength-to-density ratio. Its density, 0.93 to 0.97 grams per cubic centimeter, is slightly less than that of water (~1.0 g/cm3). It has a sufficiently high tensile strength and tends to tear and draw (strain) when it fails or is damaged, rather than brittle fracturing, thus not producing sharp, jagged edges or pieces. It resists corrosion, leaching of chemical constituents and their derivatives into the surrounding waters, and degradation caused by solar radiation, particularly in the ultraviolet wavelengths. The structural components 10, 12, 14, 16, 30, 32 composing the WAS were joined by thermal welding.

The operation of the WAS is based on the premise that amplitudes of wind-generated waves can be reduced by disrupting, reflecting, and randomizing the trajectory of the wave energy away from its initial path toward shore. Traditional floating breakwaters function in large part by simply presenting a considerable floating mass extending over a significant fraction of the length of a wave that depresses the crest of waves.

The shape of each the three tubes 12$a$, 12$b$, 14 and the array of struts 16 as cross members, presents a curved (e.g., a right, circular cylinder) face to approaching waves, virtually regardless of the direction of wave propagation. This causes the wave mass, momentum, and energy contacting the structure to be deflected and redirected away from the individual elements of the structure 10. The redirected streams are churned or thrashed by each other and subsequent encounters with other elements 12, 14, 16 of the breakwater 10 and surrounding water 37. The result is extensive dissipation of momentum and energy. Specular reflection is virtually non existent.

The top two, buoyant, surface tubes 12 function to maintain the orientation of the WAS in the water. Together, they intercept and redirected surface waves or the water moved by them. Water that does manage to pass over the windward tube 12$a$ then encounter, the shoreward tube. Again, the mass is redirected to mix with and slow down with the bulk liquid water in the region.

The perforated submerged ballast tube 14 weighs little, because of the nearly neutral density of HDPE in the water. It has almost no weight relative to the surrounding water. It has considerable mass and an area that creates substantial form drag resisting passage of water thereacross. This mass, and the resistance force of drag that the tube itself exerts in moving through the water, increase the effectiveness of the two buoyant surface tubes in redirecting water near the crests of passing surface waves.

Passing waves 44 cause the entire structure 10 to rock in a direction 11$e$ perpendicular to the direction 11$b$ of wave propagation. As the crest of a wave 44 passes the windward buoyant surface tube 12$a$, it exerts an upward lift. This causes the top of the structure 10 to tilt toward the shore, causing the submerged, perforated ballast tube 14 to rock toward the windward direction, opposite to the shoreward direction of the way 44e.

As the remaining crest of the wave 44 encounters the shoreward buoyant tube 12b, the submerged ballast tube 14 swings in pendulum-like fashion, churning through the water 37 toward the shore. As a result, the submerged ballast tube 14 causes the entire structure 10 to resist moving up and down due to form drag and contained mass. It resists rocking back and forth, yet does so, dissipating energy because of the mass, shape, and area of the tube 12, 14, 16 resistance to moving though the water. Performance of the entire WAS 10 is excellent, dissipating wave energy and momentum by churning and mixing it in a multitude of trajectories around the tubes. Two-foot high wave virtually completely dissipated. More vigorous waves self destruct under more vigorous rocking of the system 10.

The arrangement of struts 16 is structurally robust. Arrangement along principal stress lines resists failure of the system 10. The differences in orientation present a complex structural path to oncoming waves, regardless of the direction of propagation. Thus they further redirect and dissipate wave energy and momentum by providing additional round faces to redirect and collide mass flows of wave energy in a complex array of directions within, through, and around the structure 10.

Example I

A wave attenuator 10 was constructed with a six foot surface width by eight foot depth. Making the wave attenuator to have a six foot width did not allow for effective diagonal bracing. Therefore, the surface braces were parallel to the wave coming in. The system worked very well.

The ports 28 were added to add or remove (as required) water to the upper tubes 12. In the summer water was added to lower the attenuator 10 and make it more massive (added weight of water) and less visible. In the winter water was pumped out, raising the attenuator 10, making it more buoyant. Two one a half inch diameter pipes were welded into the 24 inch tube 12 (one pipe 29 was 23 inches, the other very short). Air blown into the short pipe (at five psi or less) forced water out through the long pipe 29. Flotation (buoyancy) can be infinitely adjusted.

Example II

A wave attenuator 10 (of 100 foot length) had an eight foot width across adjacent main float tubes 12 with diagonal, cross-bracing struts 16 worked well, an improvement over the six foot width with struts 16 running straight between.

Example III

Combining the wave attenuator 10 with a dock float system, was tested at a wave testing facility with scaled prototypes for testing. When hooked to pilings or other docks to reduce rocking the wave attenuator system 10 did not function satisfactorily. The attenuator 10 needs to move in response the wave 44.

Example IV

Prototype wave attenuators 10 in accordance with the invention were constructed to include three 24 inch diameter high-density polyethylene (HDPE) pipes 12, 14. Two of the three pipes, used as flotation tubes 12 with captive air, were on the surface 36 separated at an overall outside distance of eight feet (the first one was six feet). The ballast tube 14 was underwater and separated from the upper tubes 12 by the same distance, eight feet outside measure. These were held together with diagonal 12-inch-diameter HDPE struts 16. Tubes 12, 14 cut 60 feet in length are shippable by common carrier. A width of 8 feet or less is shippable without special highway permits. These flanges 30 connect the 60 foot sections of tubing together. Flanges 30 bolted together on the ends of all three tubes 12, 14. The wave attenuators 10 were held in place by tying rope around the upper 24-inch-diameter tubes 12. This rope was threaded through sleeves 34 of small HDPE pipe (which is flexible) acting as chafe guard 34. Therefore, HDPE tubes 12 are rubbing on HDPE pipe and the rope is protected. This rope goes to the seabed 40 where it is attached to an anchor system 18.

The present invention may be embodied in other specific forms without departing from its purposes, functions, structures, or operational characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An apparatus operable as a breakwater, the apparatus comprising:
   a float portion consisting essentially of a first tube and a second tube, parallel, spaced horizontally apart, and each containing a first quantity of gas sealed therein and sufficient to float the float portion proximate a surface of water subject to wave action;
   a churn portion consisting essentially of a third tube positioned below and parallel to the first and second tubes, perforated to admit and pass a portion of the water, subjecting the water to form drag through and around the third tube; and
   an anchor portion comprising a tether having a lower end and an upper end, the lower end secured with respect to a floor below the water and an upper end formed in a loop passing around at least one of the float portion and the churn portion so as to permit the breakwater to pivot freely with respect to the loop portion in response to waves moving in a non-parallel direction with respect to the first, second, and third tubes.

2. The apparatus of claim 1, further comprising braces extending between the first, second, and third tubes as the exclusive structural connections therebetween.

3. The apparatus of claim 2, wherein the braces constitute exclusive obstructions to the water passing between the first, second, and third tubes.

4. The apparatus of claim 3, wherein the braces are sized and spaced to leave open a majority of area between the third tube and the float portion to pass water therebetween.

5. The apparatus of claim 4, wherein the braces and the first, second, and third tubes subject the water to form drag therearound.

6. The apparatus of claim 5, wherein the braces subject the portion of the water passing therethrough to form drag corresponding to passage therethrough.

7. The apparatus of claim 1, wherein the churn portion is spaced from the float portion a distance selected to provide leverage against the float portion sufficient to churn into the water a significant portion of momentum created by the float portion when moving proximate the surface during passing thereby of a wave.

8. The apparatus of claim 1, wherein:
the churn portion and the float portion are interconnected to rotate in substantially rigid body motion within the bounds of material properties thereof; and
the loop portion is free to pass by both the float portion and the churn portion in the direction of the longitudinal extent of a portion of the tether forming the loop portion.

9. The apparatus of claim 1, wherein:
the loop passes around the float portion substantially unobstructed with respect to relative movement between the float portion and the loop portion in a longitudinal direction of a portion of the tether forming the loop portion.

10. An apparatus comprising:
a tether capable of securement to an anchor proximate a floor under a body of water subject to waves along a surface of the water;
an array of tubes spaced apart, first and second tubes thereof having seals selectively operable to receive the water and to contain a first quantity of gas;
the array, wherein the first and second tubes and spaced apart to constitute a float wherein each of the first and second tubes is capable of remaining in close proximity to the surface;
the array of tubes, wherein a third tube thereof is perforated to pass therethrough a portion of the water;
the array of tubes, wherein the third tube is positioned to remain below the float in operation and move in substantially rigid body motion therewith;
the tether, having a longitudinal direction and formed to include a loop operable to pass back and forth past the array, during operation, in a manner rendering the array capable of rigid body rotation with respect to the longitudinal direction of a portion of the tether constituting the loop.

11. The apparatus of claim 10 wherein the array defines a longitudinal direction thereof and the tubes are arranged to form a perimeter of triangulated cross section orthogonal to that longitudinal direction.

12. The apparatus of claim 10, wherein the array further comprises braces fixing the first second and third tubes with respect to one another.

13. The apparatus of claim 12, wherein the first, second, and third tubes are parallel.

14. The apparatus of claim 13, wherein the third tube is connected to transfer momentum from the surface into the water proximate the third tube by rotating with respect to the surface in response to the first and second tubes following changes in altitude of the surface during passing of a wave.

15. A method comprising:
providing a breakwater comprising a float of a first tube and a second tube, parallel, spaced horizontally apart and effective to maintain the float proximate a surface of water subject to waves;
the providing a breakwater, further constituting providing a third tube and a tether, the third tube positioned below and parallel to the first and second tubes and the tether formed into a loop passing around at least a portion of the breakwater so as to permit the breakwater to pivot freely with respect to the loop portion in response to waves moving in a non-parallel direction with respect to the first, second, and third tubes;
placing the breakwater in a body of water having a surface subject to action of waves;
rotating, by the float in response to undulation of the water; and
transferring energy from the surface into the water by the float driving the third tube back and forth through the water below the float in response to the rotating by the float.

16. The method of claim 15, further comprising reducing undulation of the surface by the transferring of the momentum.

17. The method of claim 15, further comprising converting energy from the surface into heat in the water proximate the third tube by the transferring of the momentum.

18. The method of claim 16 wherein the momentum is converted to thermal energy proximate the third tube by fluid drag between the third tube and the water.

19. The method of claim 15, further comprising transferring energy from the surface to a location remote from the float by spacing the third tube away from the float.

20. The method of claim 19, wherein the transferring energy from the surface is selected to be effective to suppress wave action in the water downstream, with respect to a travel direction of the wave action, to a pre-determined extent.

* * * * *